US007630954B2

(12) United States Patent
Adamczyk et al.

(10) Patent No.: US 7,630,954 B2
(45) Date of Patent: *Dec. 8, 2009

(54) DATA CARRIER COMPRISING AN OPTICALLY VARIABLE ELEMENT

(75) Inventors: Roger Adamczyk, Isen (DE); Peter Franz, Bruck (DE)

(73) Assignee: Giesecke & Devrient GmbH, Munich (DE)

( * ) Notice: Subject to any disclaimer, the term of this patent is extended or adjusted under 35 U.S.C. 154(b) by 718 days.

This patent is subject to a terminal disclaimer.

(21) Appl. No.: 10/524,139

(22) PCT Filed: Aug. 11, 2003

(86) PCT No.: PCT/EP03/08891

§ 371 (c)(1), (2), (4) Date: Feb. 11, 2005

(87) PCT Pub. No.: WO2004/022355

PCT Pub. Date: Mar. 18, 2004

(65) Prior Publication Data

US 2005/0240549 A1 Oct. 27, 2005

(30) Foreign Application Priority Data

Aug. 13, 2002 (DE) ................................ 102 37 642
Sep. 20, 2002 (DE) ................................ 102 43 863

(51) Int. Cl.
*G06F 7/00* (2006.01)

(52) U.S. Cl. ................................ 707/1; 283/72; 283/74; 283/91; 283/86; 428/916; 428/956; 428/204; 156/277; 156/283

(58) Field of Classification Search ..................... 707/1; 283/74, 86, 72, 91; 428/916, 956, 204; 156/277, 156/283
See application file for complete search history.

(56) References Cited

U.S. PATENT DOCUMENTS

| | | | | |
|---|---|---|---|---|
| 5,582,103 | A | 12/1996 | Tanaka | |
| 5,722,693 | A | 3/1998 | Wicker | |
| 6,036,233 | A * | 3/2000 | Braun et al. | 283/91 |
| 6,183,018 | B1 * | 2/2001 | Braun et al. | 283/114 |
| 6,357,800 | B1 * | 3/2002 | Muller et al. | 283/93 |
| 6,928,925 | B1 * | 8/2005 | Mayer et al. | 101/150 |

(Continued)

FOREIGN PATENT DOCUMENTS

CA 1019012 * 10/1977

(Continued)

*Primary Examiner*—Mark F Huff
*Assistant Examiner*—Anna L Verderame
(74) *Attorney, Agent, or Firm*—Rothwell, Figg, Ernst & Manbeck, P.C.

(57) ABSTRACT

A data carrier with an optically variable structure having an embossed structure with raised areas and a first coating contrasting with the surface of the data carrier. The embossed structure and the first coating are so combined that at least parts of the coating are completely visible upon perpendicular viewing but concealed upon oblique viewing so that a tilt effect arises upon alternate perpendicular and oblique viewing. The first coating is provided only in certain areas. Additionally, the optically variable structure has at least in partial areas a second coating likewise contrasting with the data carrier surface and disposed in overlap with the first coating at least in partial areas.

35 Claims, 5 Drawing Sheets

U.S. PATENT DOCUMENTS

| | | | | |
|---|---|---|---|---|
| 7,377,444 B2 * | 5/2008 | Franz et al. | ................. | 235/487 |
| 2003/0145747 A1 * | 8/2003 | Mayer et al. | ................ | 101/395 |
| 2005/0115425 A1 * | 6/2005 | Plaschka et al. | ............. | 101/170 |

FOREIGN PATENT DOCUMENTS

| | | | |
|---|---|---|---|
| EP | 0 372 274 | | 6/1990 |
| EP | 0 440 045 | | 8/1991 |
| WO | WO 97/17211 | | 5/1997 |
| WO | WO 98/53999 | | 12/1998 |
| WO | WO 02/20280 | | 3/2002 |
| WO | WO 03/052702 | * | 6/2003 |

* cited by examiner

DATA CARRIER COMPRISING AN OPTICALLY VARIABLE ELEMENT

CROSS-REFERENCE TO RELATED APPLICATION

This application is a National Phase of International Application Serial No. PCT/EP03/08891, filed Aug. 11, 2003.

FIELD OF THE INVENTION

This invention relates to a data carrier with an optically variable structure having an embossed structure with raised areas and a first coating contrasting with the surface of the data carrier, the embossed structure and the coating being so combined that at least parts of the coating are completely visible upon perpendicular viewing but concealed upon oblique viewing so that a tilt effect arises upon alternate perpendicular and oblique viewing. The invention further relates to a method for producing such a data carrier.

DESCRIPTION OF THE BACKGROUND ART

It has been known for some time to equip data carriers, such as bank notes, papers of value, credit cards or ID cards or the like, with optically variable security elements, in particular optically variable diffraction structures such as holograms. Protection from forgery by holograms is based on the different optical impression of said holograms that occurs upon a change of viewing angle relative to the hologram. Said optically variable impression cannot be rendered by copying machines since copying machines only render the appearance of the hologram from a certain viewing angle. A data carrier with such a hologram is known for example from EP 0 440 045 A2. This print proposes applying the hologram to the data carrier as a prefabricated element or as an embossing in a lacquer layer applied to the data carrier.

However, there are other optically variable security elements that can be provided on a data carrier. Thus, it is known for example from CA 1 019 012 to provide a bank note in a partial area of its surface with a parallel printed line pattern. To produce the optically variable effect, a line structure is additionally embossed into the data carrier in the area of the printed line pattern so as to form flanks visible only at certain viewing angles. Selectively disposing the printed line pattern on like-oriented flanks of the embossed line structure causes the line pattern to be visible upon oblique viewing of the flanks provided with the lines. Upon oblique viewing of the rear side of the flanks the line pattern is not recognizable.

The antiforgery effect of such embossed optically variable security elements can be improved further if additional visually recognizable effects are produced by selectively changing the line pattern or embossed structure. Examples of such additional effects are described in WO 97/17211 and WO 02/20280.

The optically variable effect of the latter known security elements arises fundamentally from the combination of a print with a blind embossing that is preferably produced by intaglio printing. Blind embossing has the disadvantage that it cannot be integrated into a colored intaglio image but can only be used as an isolated security feature. This is because a relatively great distance between the blind embossing areas and the ink-carrying areas is required to make sure that absolutely no ink gets into the blind embossing depressions when the intaglio printing plate is inked.

SUMMARY OF THE INVENTION

The invention is therefore based on the problem of proposing a data carrier with an optically variable security element of the abovementioned kind that can be integrated into a printed image.

This problem is solved by the features disclosed herein.

The invention is based on the finding that the optically variable effect of the security element is retained if an ink-carrying embossing is used instead of the blind embossing. That is, the optically variable structure has at least in partial areas a second coating likewise contrasting with the data carrier surface and disposed congruent to the raised areas of the embossed structure. The second coating offers the advantage of stabilizing the embossed structure without an additional printing operation.

Moreover, the inventive security element has the advantage that it can be integrated into an intaglio motif and thus into the representational and color design of the main motif.

Intaglio printing is characterized in that linear depressions are provided in the printing plates to produce a printed image. Areal representations are also produced by closely adjacent engraved lines, the individual engraved lines normally being fractions of a millimeter wide.

For the printing operation the engraved lines of the plate are filled with ink. Surplus ink is removed from the plate with the help of a wiping cylinder or doctor blade such that the engraved lines are filled with ink up to the edge. During the printing operation the data carrier to be printed, normally paper, is finally pressed onto the plate with high pressure by means of a pressure cylinder having an elastic surface. The data carrier is thereby pressed into the ink-filled engraved lines of the plate, thus coming in contact with the ink. When the data carrier is detached it pulls the ink out of the depressions of the engraved lines. The thus produced printed image has printed lines that vary in ink layer thickness depending on the depth of engraving. The data carrier is pressed into the depressions of the plate so strongly that it not only receives ink from the depressions but is also simultaneously embossed.

When translucent inks are used in intaglio printing, light color tones are obtained if a white data carrier is printed with thin ink layers, and darker color tones if printed with thick ink layers. This effect can also be utilized within the scope of the invention to produce different color effects and increase the contrast of the tilt effect. Likewise, it is possible to combine translucent and nontranslucent inks.

The inventive optically variable structure can therefore be integrated into the printing plate of an intaglio motif in a very simple way by providing the embossed structure likewise in the form of depressions in the plate. During the printing operation the depressions belonging to the embossed structure are filled with an ink having for example the same color as the intaglio motif to be printed. This ink layer, which is transferred to the data carrier with the embossing operation, forms the inventive second coating disposed congruent to the raised areas of the embossed structure.

It is not necessary for the total embossed structure to be inked with this color. Only partial areas of the embossed structure can also be provided with a color. Alternatively, it is also possible to provide the embossed structure with different colors or a color flow. Such a color flow can be produced via a color split whereby the printing plate is accordingly inked by means of single color stencils. Preferably, the color of the second coating is integrated into the color design of the intaglio motif.

The color split and a corresponding choice of printing inks employed are used selectively here to control the contrast of the optically variable structure.

The color split can also be used to make parts of the optically variable structure machine-readable by adding at least one feature substance, such as a luminescent substance, magnetic substance or electrically conductive substance, to at least one of the inks. Different parts of the optically variable structure can also be provided with different feature substances. Alternatively, the total optically variable structure can also be equipped with a uniform machine-readable property.

The optically variable structure can be directly adjacent to the intaglio motif or else be part of the steel intaglio motif.

Since such intaglio motifs are primarily applied in security printing, the inventive data carrier is preferably a paper of value, in particular a bank note. The paper of value can be a security paper made of cotton fibers, a paper containing synthetic fibers and/or chemical pulp, or consist of pure plastic foils. Such a paper of value can also be used advantageously for protecting any products and goods.

The second coating disposed in the area of the embossed structure can moreover have a color contrasting with the first coating and be disposed at least in partial overlap with the first coating. Further, one of the coatings can have machine-readable properties at least in certain areas. These may be for example magnetic, electrically conductive or luminescent properties. Finally, the data carrier can have a metallic background layer in the area of the optically variable structure.

The embossed structure is preferably executed as a screen structure. It can be triangular, but also trapezoidal, sinusoidal, semicircular or another shape. Preferably, the embossed structure is executed as a line screen with a constant screen ruling. In some embodiments, however, it can also be expedient to use different screen rulings. For example, the screen ruling can increase continuously in the edge area of the optically variable structure so that the embossed structure quasi tapers out. The same effect can be obtained by a continuous reduction of line width with constant or increasing screen ruling. In this edge area the first coating can be adapted in accordance with the embossed structure or be completely lacking.

Further effects can be obtained if the flank angles vary within a line of the embossed structure executed as a line screen.

To better bring out the optically variable effects, the embossed structure can be subdivided into partial areas where different partial embossed structures are provided, as described in WO 02/20280. The disclosure of this print is incorporated in the present invention by reference.

The partial areas preferably form a two-dimensional matrix having m partial areas in the horizontal direction and n partial areas in the vertical direction, where $m, n \geqq 1$, preferably $m, n \geqq 2$. The partial embossed structures in at least two adjoining partial areas are disposed mutually offset by a fraction, in particular one third, of the screen ruling.

The first coating is preferably a print likewise formed as a screen structure, whereby the individual screen elements can be designed at will. However, a line screen with a constant screen ruling is preferably used. According to a preferred embodiment, said line screen consists of printed lines of any desired color design. The print is done by any desired printing process, such as offset or screen printing. Any desired indirect printing processes, such as indirect letterpress, can also be applied. The methods moreover make it possible to provide the first coating with a color flow, a so-called "rainbow blend."

Printed screen and embossed structure are adjusted to each other, preferably such that the width of the printed screen lines is somewhat smaller than the length of the flanks of the embossed structure lines and that they extend parallel or largely parallel. Printed screen and embossed structure need not necessarily extend in a straight line, they can instead also be designed in the form of wavy lines, etc. The line widths are between 25 microns and 300 microns, preferably between 55 microns and 150 microns. If the line screen is composed of printed, spaced-apart lines, a ratio of about 1:1 is preferably selected for the ratio of printed to unprinted areas. If a line width in the order of magnitude of about 100 microns is additionally selected, the lines can virtually no longer be resolved by the eye and a homogeneous color effect arises. That is, the line screen is visually perceived only as a homogeneous colored surface. Additionally, the lines can be executed thicker in certain areas and thus represent for example a halftone image or another motif. Preferably, the lines only have thickened areas on one side. This likewise leads to stronger contrast. Alternatively, the lines can have gaps to produce an additional visually recognizable pattern. The first coating and/or the embossed structure can also be executed so as to repeat the content of other information present on the document of value to make comparison possible.

Quite generally it is to be underlined that the color design of the security element can be adjusted at will by a corresponding color choice of first and second coatings, since the mixture of the two colors is always perceived at least in a top view. Likewise, the information perceptible from different viewing angles can be adjusted by a corresponding choice of parameters, such as color, line thickness and line modulation of the first coating and flank angle, flank height and flank modulation of the embossed structure.

Rasterization of the print can be dispensed with if optically variable inks are used, i.e. inks having different optical effects dependent on the angle of vision. These may be high-gloss, e.g. metallic, layers or else inks that change their color effect themselves in angle-dependent fashion, as is the case for example with liquid crystal pigment inks.

However, an inventive optically variable structure with a rasterized first coating can also be additionally underlaid or covered with an optically variable printed image. This is preferably done with printing inks having interference layer and/or liquid crystal pigments. An additional metallic background is also conceivable. The printed image can be executed to be positive or negative. The use of liquid crystals additionally provides elevated protection from forgery since the printed image in this case has light-polarizing properties that can be read by machine. This holds in particular when the printed image is composed of partial printed images, with liquid crystals having different polarization properties being used for the partial printed images.

The inventive optically variable structure can be underlaid or covered, not with an additional printed image, but with a foil element, such as a diffraction structure embossed into a lacquer layer. Here, any desired layer structures and types of foil elements can be used, such as real holograms, lattice structures, volume holograms that are executed to be transparent, semitransparent or opaque.

According to a preferred embodiment, the inventive optically variable structure consists of a print in the form of a printed line screen, a first color and an embossed structure superimposed on said line screen and likewise executed in linear fashion whose raised areas are provided with a further color contrasting with said first color. Said second color is preferably produced by means of translucent printing inks that have a certain transparency so that the color of the first coating shines through said color and the viewer thus perceives a mixed color in the superimposed areas. Especially good effects are achieved if there is a complementary contrast between the first and second colors.

When viewing said optically variable structure perpendicular to the data carrier surface, the viewer ideally recognizes only a uniform color effect. When the data carrier is tilted or the viewing angle changed, parts of the first and/or second coating are concealed by the embossed structure, so that in certain areas the color effect of the first or second coating or of the mixed color of the two coatings predominates and thus variable color effects arise.

This interplay of colors appears all the more clearly the better-contrasting the colors of the two coatings are. For example, a dark, e.g. black, line screen can be combined with a well-contrasting colored intaglio print with translucent inks, such as yellow or other light color tones. The first coating in the form of a black line screen is preferably printed on here by the offset process.

Alternatively, a further preferably all-over ink layer can be disposed under the first preferably screenlike coating. Said layer serves to stabilize the paper in the area of the security element and permits sharper edges in the area of the embossed structure. Said layer can be executed as a primer or colored lacquer layer or else contribute additionally to the color design of the security element if said layer has a color contrasting with the first coating. One can use conventional printing inks or else special-effect inks, such as luminescent inks or printing inks containing interference or liquid crystal pigments.

Finally, additional information can also be incorporated by designing the embossed structure and/or first coating accordingly. For example, the raised areas of the embossed structure can have different heights. If the embossed structure is produced by intaglio printing, this means that the engraving depths for the embossed structure are selected differently. The areas of lower engraving depth are filled with less ink in the printing or embossing operation and produce areas with a lighter color tone if translucent inks are used. In this way the inventive second coating can be used to produce additional information visually recognizable at all viewing angles. Due to the different embossing heights, however, a change of viewing angle yields additional optically variable effects that are caused by the relative position of the first and second coatings as well as the embossed structure and the interplay thereof.

The additional information can also be emphasized by an unembossed edge contour, as already described in WO 02/20280. Alternatively, the edge contour can also be provided with the second coating and the embossed structure according to the invention.

As mentioned above several times, the inventive optically variable security element is preferably produced in two printing operations. In a first printing operation, preferably by the offset process or an indirect printing process, the first coating is printed on the data carrier. In the second printing operation, which is preferably done by intaglio according to the invention, the embossed structure and the second coating are finally transferred to the data carrier simultaneously.

Similar optical effects can be achieved if the two coatings are printed on in register to each other by offset and/or screen printing and this printed area is then provided with a blind embossing likewise in register. All embodiments described within the scope of the invention can be produced in this way. According to a special embodiment, for example, a line screen in a first color can be applied and at least partly in overlap therewith a second coating of translucent inks all over. In a last step, the total printed area is provided with a blind embossing in the form of a line screen in register.

However, it is also possible to use the reverse order, providing first the embossed structure and second coating on the data carrier and then the first coating.

BRIEF DESCRIPTION OF THE DRAWINGS

Further embodiments and advantages of the invention will be explained with reference to the figures, in which.

DETAILED DESCRIPTION OF THE INVENTION

Figure 1:
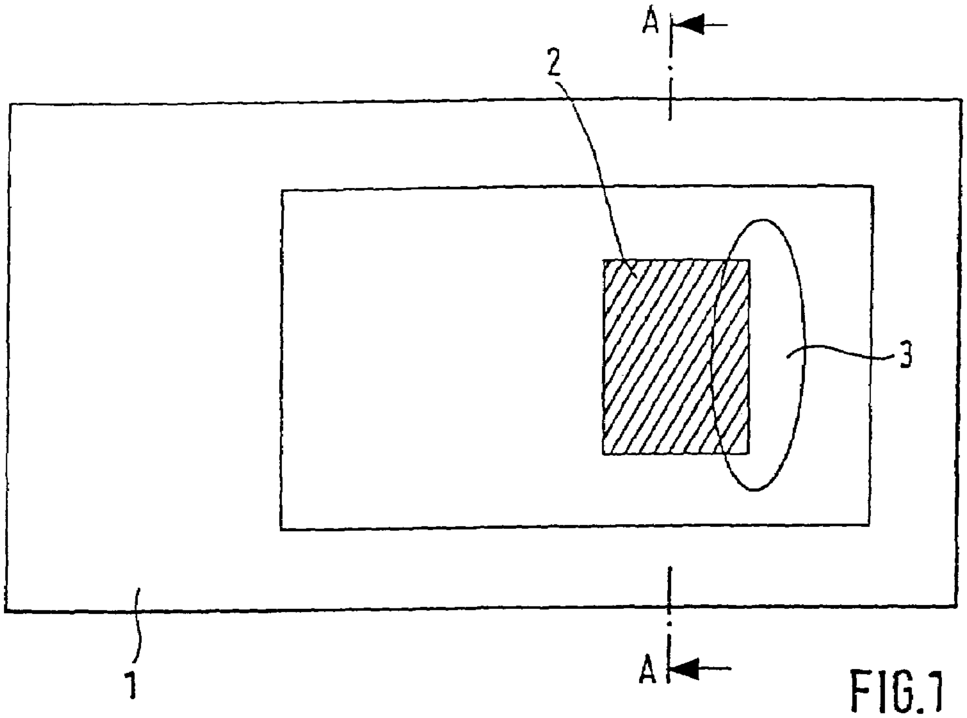
FIG. 1 shows an inventive data carrier.

FIG. 1 shows inventive data carrier 1 with optically variable structure 2. Optically variable structure 2 is a security feature that can be checked without aids and is used optionally alongside further security features for checking the authenticity of the data carrier. The further security features may be for example a security thread, watermark or the like. As preferred within the scope of the invention, optically variable structure 2 is disposed in the area of intaglio motif 3 of document of value 1. The geometrical and color design of optically variable security element 2 can be adapted to intaglio motif 3. Depending on the execution of intaglio motif 3, optically variable structure 2 can also be integrated completely into said intaglio motif.

However, the inventive security element can alternatively be disposed at any other place on document of value 1.

It is especially advantageous to use inventive optically variable structure 2 in bank notes, as well as other papers of value such as shares, checks or the like. Labels or other elements for product protection can also be provided with such an optically variable structure.

Optically variable structure 2 consists according to the shown embodiment of a first coating in the form of a print contrasting with the surface of the data carrier as well as an embossed structure and a second coating that likewise contrasts in color with the data carrier surface and is disposed congruent to the raised areas of the embossed structure. The various elements of optically variable structure 2 are combined with each other such that at least partial areas of the first coating are completely visible upon perpendicular viewing but concealed upon oblique viewing.

Figure 2:
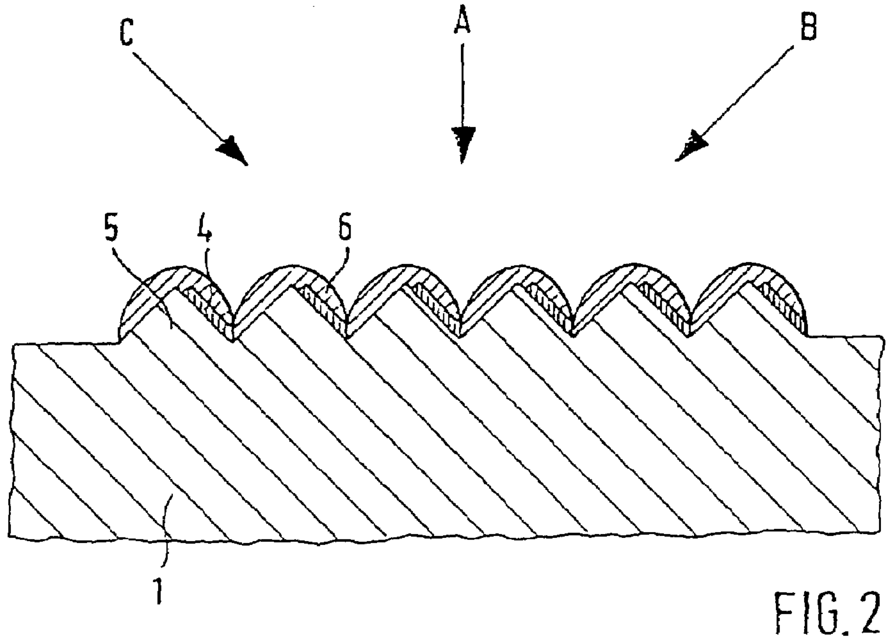
FIG. 2 shows a section along A-A in FIG. 1.

This principle is made clear by the section along A-A shown in FIG. 2. First coating 4 consists of line screen 4, in the case shown here, and embossed structure 5 is also designed in the form of a line screen structure. Second ink layer 6 is disposed congruent to embossed structure 5, thus completely covering first coating 4. Upon perpendicular viewing from viewing direction A, the viewer ideally recognizes only a colored surface whose color largely corresponds to the mixed color of first coating 4 and second coating 6. Upon oblique viewing from viewing direction B, the viewer is faced by the flank of embossed structure 5 that coincides with the printed lines of printed screen 4. The viewer therefore perceives from viewing direction B an almost uniform colored print in the color of the mixed color from first coating 4 and second coating 6. In viewing direction C the viewer is faced by the flanks of embossed structure 5 that coincide with the particular gap of line screen 4, so that from this direction the viewer perceives a likewise uniformly colored surface in the color of second coating 6.

Embossed structure 5 and second coating 6 are preferably transferred to document of value 1 by the intaglio printing plate. This has the advantage that the security element can be produced simultaneously with intaglio motif 3 in one operation. For this purpose, both the negative of desired embossed structure 5 and the intaglio motif are engraved into the printing plate. During the printing operation the printing plate is filled with ink and then data carrier material 1 is pressed into the engraved areas of the plate and lastingly deformed. The high contact pressure causes embossing 5 to also be noticeable on the back of data carrier material 1.

The printing plate can be inked with a uniform color for the printing operation so that second coating 6 and intaglio motif 3 have the same color. Different colors can also be used, however.

Since translucent inks are preferably used for second coating 6, the viewer can recognize the mixed color of the two colors in the overlap area between first and second coatings 4, 6.

Embossed structure 5 shown in FIG. 2 consists of directly adjoining triangular profiles when viewed in cross section. However, the triangular profiles can also be slightly spaced apart. The relative position of first coating 4 and second coating 6 or embossed structure 5 can also vary, as made clear by FIGS. 3 to 5. Here, only the embossed profile and the relative position of coatings 4, 6 are shown.

Figure 3:
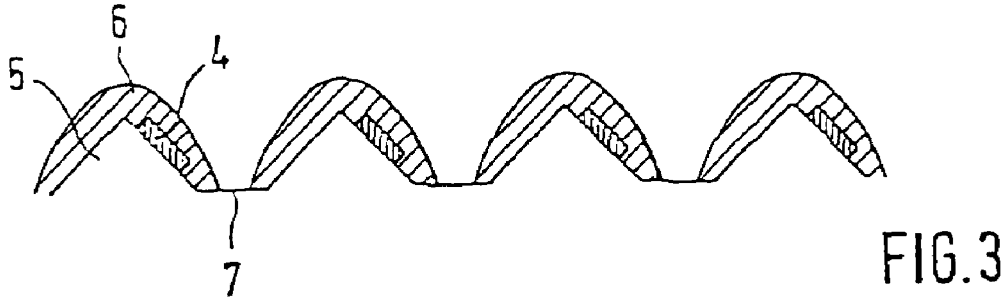
FIG. 3 shows a schematic representation of the relative position between the first and second coatings of the inventive security element in a first embodiment.

In FIG. 3 the triangular profiles of embossed structure 5 are spaced apart, which is indicated by connection bars 7. First coating 4 is disposed on one of the flanks of embossed structure 5 below second coating 6, as shown in FIG. 2. Connection bars 7 are coating-free, however, so that the data carrier surface is visible in this area.

Figure 4:
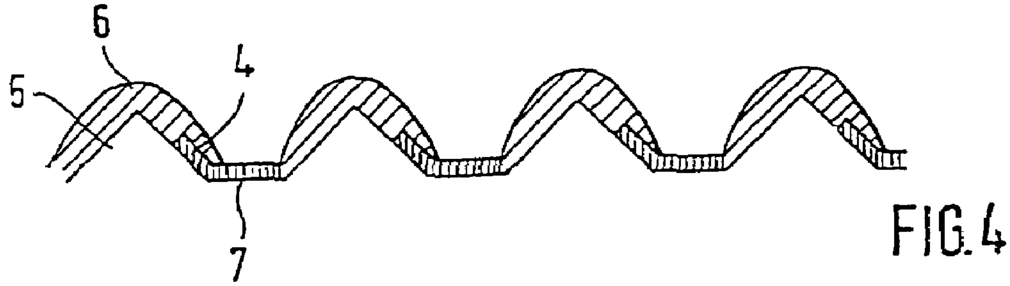
FIG. 4 shows a schematic representation of the relative position between the first and second coatings of the inventive security element according to a second embodiment.

FIG. 4 shows a variant in which first coating 4 completely covers connection bars 7 and part of the flanks of embossed structure 5. In this example, second coating 6 covers first coating 4 only partly, so that first coating 4 is also visible in partial areas.

Figure 5:
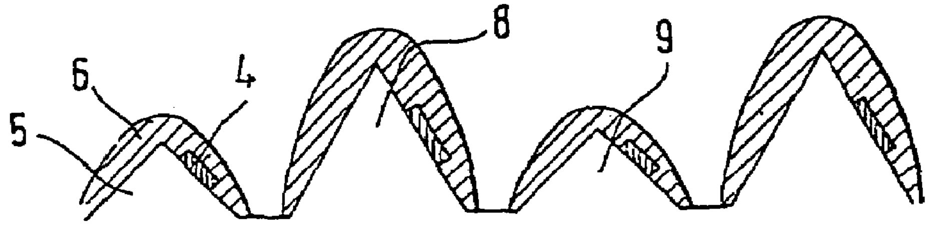
FIG. 5 shows a schematic representation of the relative position of the first and second coatings of the inventive security element according to a third embodiment, the embossed structure having raised areas of different heights.

FIG. 5 shows a further embodiment in which the relative position of embossed structure 5, first coating 4 and second coating 6 corresponds to the embodiment already shown in FIG. 3. However, the raised areas of embossed structure 5 have different heights in this example. If embossed structure 5 and coating 6 are produced by ink-carrying intaglio printing, this means that more ink is transferred in the areas of the embossed structure with the higher raised areas. Due to the higher ink layer thickness in area 8 of embossing 5, partial areas 8 of embossing 5 appear in a darker color tone than partial areas 9 of embossing 5. In this way, additional information can be produced in the optically variable element.

However, such visually recognizable additional information can also be produced in other ways. If translucent printing inks are used, the additional information can also be represented by a higher ink layer thickness in certain areas of the printed image.

Figure 6:
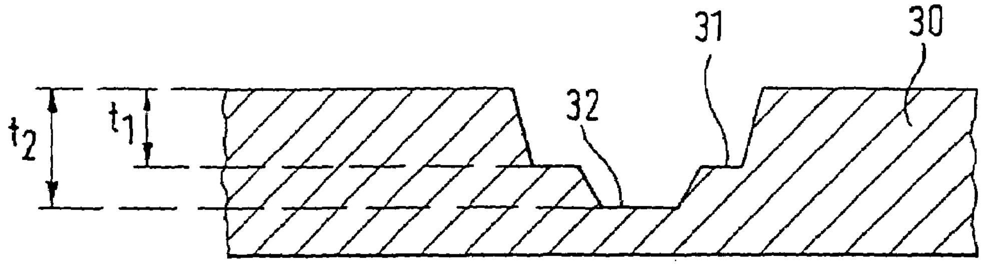
FIG. 6 shows an inventive embossing mold in cross section for producing the embossed structure with additional information, FIG. 7. shows a further embodiment of the inventive embossing mold.

FIG. 6 shows in cross section printing plate 30 for producing such additional information. First printed image 31 is engraved into plate 30 with depth $t_1$. Second printed image 32, which is superimposed on first printed image 31, is engraved into plate 30 with depth $t_2$. Since the engraving for second printed image 32 is deeper than the engraving for first printed image 31, more ink is transferred in the area of printed image 32. When translucent printing inks are used, a darker color effect therefore results in the area of printed image 32, and printed image 32 is recognizable against lighter printed image 31. According to this example, the two printed images 31, 32 form the second coating that is transferred to the document of value simultaneously with the embossed structure in the printing operation.

Figure 7:
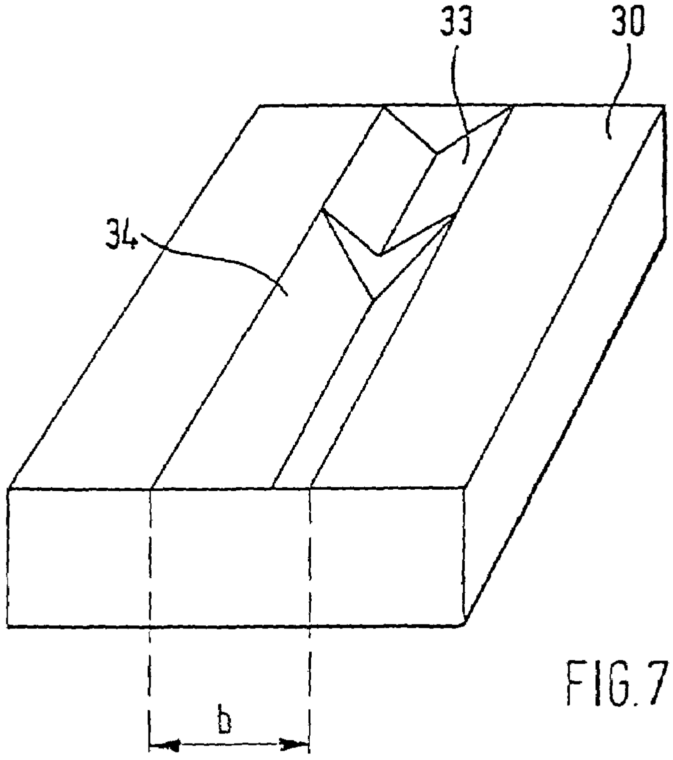

FIG. 7 shows a further variant for producing additional information in the second coating. It again shows printing plate 30, into which a line with width b is milled. Said line is composed of different areas 33, 34 that differ in their depth and flank steepness. In the finished printed image said line shows different color effects along its length since the inking is different in areas 33, 34.

If the line depth is too great, paper tears might occur during the embossing operation. To therefore permit the same line width to be retained, it might therefore be necessary to make the line just as wide but less deep. If a milling tool is used for producing the printing plate, it might therefore be necessary to produce the line by means of a narrower engraving tool that nevertheless produces the width of the desired engraved line by corresponding guidance of the milling tool.

Figure 8:
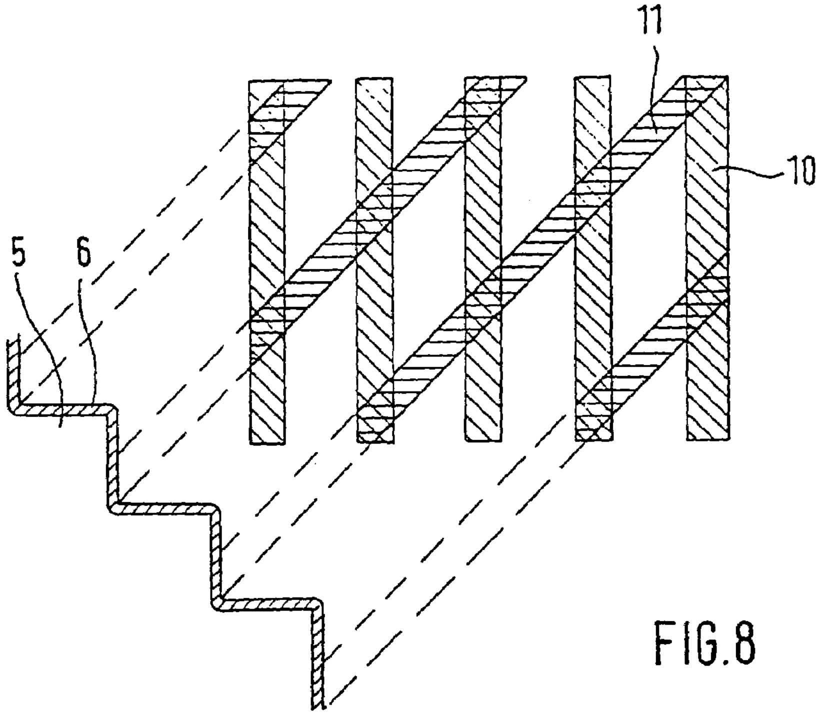
FIG. 8 shows a further variant of the inventive security element.

FIG. 8 shows a further embodiment of the inventive optically variable structure. In this example, the first coating consists of two crosswise disposed line screens 10, 11 that can also be designed in different colors. In the shown example, the lines of printed screen 11 are disposed on one of the flanks of embossed structure 5. This association emerges from the profile sketches at the lower edge of FIG. 8, which shows a detail of embossed structure 5 and coating 6 in cross section.

Figure 9:
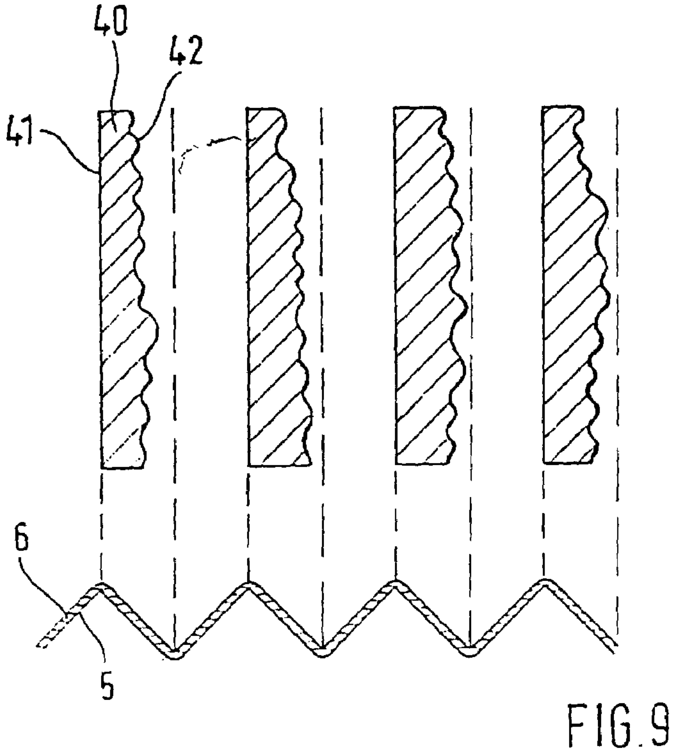
FIG. 9 shows a further variant of the inventive security element.

FIG. 9 shows an embodiment of the inventive optically variable structure in which the first coating consists of one-sided screen 40. Said screen starts at straight baseline 41. Opposite line 42 of the screen element is of irregular design and can vary from screen element to screen element. This particular screen can be used to represent very well-contrasting halftone images. As explained above with reference to FIG. 8, said screen elements 40 preferably come to lie on the flanks of embossed structure 5 and are covered by second coating 6.

Figure 10:
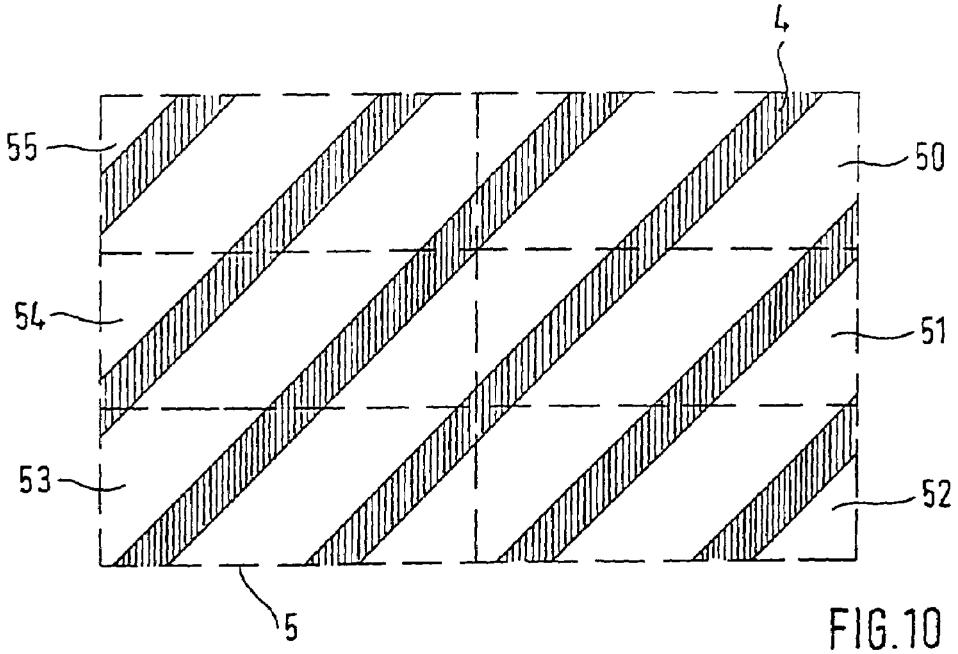
FIG. 10 shows a special embodiment of the inventive security element wherein the embossed structure is present in the form of a matrix.

FIG. 10 shows a top view of the basic structure of inventive optically variable structure 2. It consists of the first coating in the form of line screen 4 with a constant screen ruling, the line screen consisting of spaced-apart printed lines. Embossed structure 5 is disposed in overlap with print 4, being indicated only by the dash-lined frame for clarity's sake. Shown embossed structure 5 is subdivided into six partial areas 50, 51, 52, 53, 54, 55 where partial embossed structures are disposed, being omitted from the drawing as mentioned above. The second coating, which is disposed congruent to the raised areas of the partial embossed structures, is not shown either. Partial areas 50, 51, 52, 53, 54, 55 are directly adjacent here and form a two-dimensional matrix. Depending on the embodiment, said matrix can have n partial areas in the vertical direction and m partial areas in the horizontal direction, where n, m≧1, preferably n, m≧2. In the shown example, n≅3 and m≅2. A second coating, which is likewise omitted from the drawing, is disposed congruent to the raised areas of embossed structure 5 in this example as well.

The relative position of the partial embossed structures and line screen 4 varies within embossed structure 5 from partial area to partial area, so that partial areas 50, 51, 52, 53, 54, 55 differ in their color, color tone or brightness and are thus visually recognizable as contrasting partial areas. Upon a change of viewing angle, the color and light/dark impressions of the partial areas vary. This impression is strengthened by superimposed second coating 6.

Figure 11:
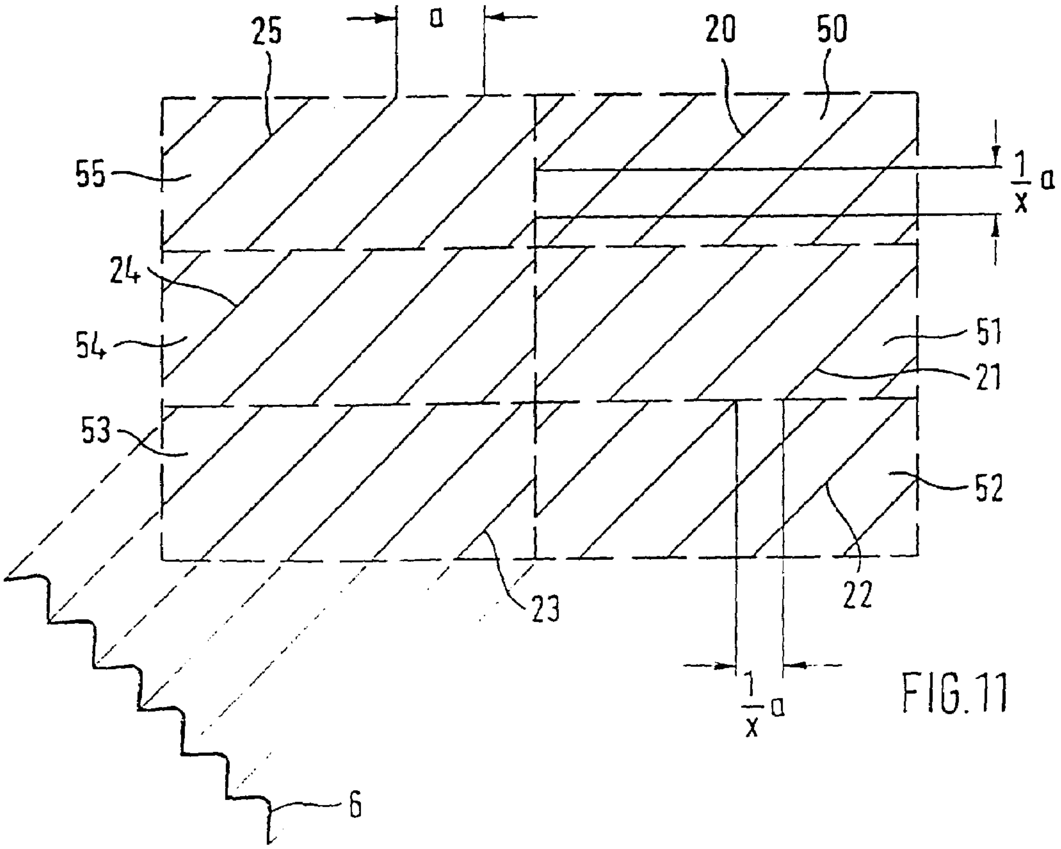
FIG. 11 shows a special embodiment of the embossed structure of the inventive security element.

FIG. 11 schematically shows a further special embodiment of embossed structure 5. It is composed of partial areas 50, 51, 52, 53, 54, 55 where different partial embossed structures 20, 21, 22, 23, 24, 25 are disposed. The sloping lines in FIG. 11 indicate the course and arrangement of particular partial embossed structure 20, 21, 22, 23, 24, 25. The shown lines mark the valleys of the embossed structure, as is made clear by the sketch in the left area under embossed structure 5, which shows partial embossed structure 23 in cross section. For clarity's sake, the zeniths of partial embossed structures 20, 21, 22, 23, 24, 25 have not been shown with lines in the figures.

All partial embossed structures 20, 21, 22, 23, 24, 25 have same screen ruling a. However, pairs of adjoining partial embossed structures 20, 21, 22, 23, 24, 25 are mutually offset. In the shown example, the offset is preferably a fraction 1/x of screen ruling a. Preferably, a pair of adjacent partial embossed structures is mutually offset by one third of screen ruling a. The first coating has been omitted in FIG. 11 for clarity's sake. Since the arrangement of the partial embossed structures and congruently disposed second coating varies from partial area to partial area, however, the relative position between the first coating and particular partial embossed screen 20, 21, 22, 23, 24, 25 also varies accordingly. This produces frequently changing light/dark contrasts and changing color effects that visually stand out clearly and are well recognizable. If the offset is selected for example so that the partial embossed structures recur within embossed structure 5, a plurality of partial areas show the same appearance from one viewing angle. However, partial embossed structures 20, 21, 22, 23, 24, 25 of inventive embossed structure 5 need not be fundamentally offset by a fraction of screen ruling a. Any other offset is equally conceivable. Also, not all partial embossed structures 20, 21, 22, 23, 24, 25 need be mutually offset. In some circumstances it is sufficient if only two of partial areas 50, 51, 52, 53, 54, 55 are provided with mutually offset partial embossed structures 20, 21, 22, 23, 24, 25. The latter also need not necessarily be directly adjacent. Likewise, single partial areas 50, 51, 52, 53, 54, 55 can be provided with partial embossed structures 20, 21, 22, 23, 24, 25 with different screen ruling a. The extending direction of single partial embossed structures 20, 21, 22, 23, 24, 25 can also vary with respect to the extending direction of adjacent partial embossed structures 20, 21, 22, 23, 24, 25. For example, partial embossed structure 20 can be disposed at an angle of 90° to partial embossed structure 21.

In the shown examples, the first coating was always applied first and then embossing 5 or second coating 6. Alternatively, it is of course also possible to first apply the embossed structure and the second coating and then print the first coating on the second coating.

The invention claimed is:

1. A data carrier with an optically variable structure having an embossed structure with raised areas and a first coating contrasting with the surface of the data carrier and provided only in certain areas, the embossed structure and the coating being so combined that at least parts of the coating are completely visible upon perpendicular viewing but concealed upon oblique viewing so that a tilt effect arises upon alternate perpendicular and oblique viewing, and the optically variable structure having at least in partial areas a second coating disposed in overlap with the first coating at least in partial areas, characterized in that the second coating likewise contrasts with the data carrier surface and at least one of the coatings comprises, at least partly, translucent inks, and further characterized in that the first coating is a printed line screen structure with a constant screen ruling and thickened areas at least in certain areas and only on one side.

2. A data carrier according to claim 1, characterized in that the second coating is disposed congruent to at least parts of the raised areas of the embossed structure.

3. A data carrier according to claim 2, characterized in that the data carrier has an intaglio motif.

4. A data carrier according to claim 3, characterized in that at least parts of the embossed structure are disposed in the area of the intaglio motif.

5. A data carrier according to claim 3, characterized in that the second coating has the same color as the intaglio motif.

6. A data carrier according to claim 3, characterized in that the second coating is part of the intaglio motif.

7. A data carrier according to claim 1, characterized in that the second coating has a color contrasting with the first coating.

8. A data carrier according to claim 1, characterized in that the color used for the first coating has a complementary contrast with the color of the second coating.

9. A data carrier according to claim 1, characterized in that the first and second coatings are disposed at least partly in overlap.

10. A data carrier according to claim 1, characterized in that the optically variable structure has a metallic background layer.

11. A data carrier according to claim 1, characterized in that at least one of the first or second coating has machine-readable properties at least in certain areas.

12. A data carrier according to claim 11, characterized in that at least one of the first and/or second coating has magnetic, electrically conductive or luminescent properties.

13. A data carrier according to claim 1, characterized in that the optically variable structure is superimposed or underlaid with an additional trans-parent optically variable layer or a foil element.

14. A data carrier according to claim 1, characterized in that one of the coatings is of multicolor design.

15. A data carrier according to claim 1, characterized in that the line screen comprises colored, spaced-apart lines or colored, directly adjoining lines.

16. A data carrier according to claim 1, characterized in that the line screen represents a halftone image.

17. A data carrier according to claim 1, characterized in that the embossed structure is an embossed screen structure.

18. A data carrier according to claim 1, characterized in that the embossed structure is executed as a line screen with a constant screen ruling.

19. A data carrier according to claim 1, characterized in that the embossed structure has a varying screen ruling in certain areas.

20. A data carrier according to claim 1, characterized in that the embossed structure and the second coating are executed as colored intaglio prints.

21. A data carrier according to claim 1, characterized in that the first coating is a dark line screen and the second coating is present in the form of a light, colored line screen.

22. A data carrier according to claim 1, characterized in that the embossed structure has raised areas of different height.

23. A data carrier according to claim 1, characterized in that the embossed structure and the first coating have the same screen ruling.

24. A data carrier according to claim 1, characterized in that the embossed structure is subdivided into partial areas where different partial embossed structures are provided.

25. A data carrier according to claim 24, characterized in that the partial areas form a two-dimensional matrix having m partial areas in the horizontal direction and n partial areas in the vertical direction, where m, n≧1, preferably m, n≧2.

26. A data carrier according to claim 24, characterized in that the partial embossed structures in at least two adjoining partial areas are disposed offset by a fraction, in particular one third, of the screen ruling.

27. A data carrier according to claim 24, characterized in that at least the partial embossed structures of one partial area have an unembossed edge contour.

28. A data carrier according to claim 1, characterized in that the data carrier is a paper of value.

29. A method for producing a data carrier with an optically variable structure having an embossed structure with raised areas and a first coating contrasting with the surface of the data carrier and applied to the data carrier only in certain areas, the embossed structure and the coating being so combined that at least parts of the coating are completely visible upon perpendicular viewing but concealed upon oblique viewing so that a tilt effect arises upon alternate perpendicular and oblique viewing, characterized by the following steps:

applying the first coating to the data carrier only in certain areas, wherein the first coating is a printed line screen structure with a constant ruling and thickened areas at least in certain areas and only on one side, embossing the embossed structure in the data carrier by means of an embossing tool, whereby with the embossing a second coating comprising, at least partly, translucent inks is transferred to the data carrier in overlap with the first coating at least in partial areas, whereby a color likewise contrasting with the surface of the data carrier is selected for the second coating, and the transferring of the second coating to the data carrier is done congruently to at least parts of the raised areas of the embossed structure.

30. A method according to claim 29, characterized in that the data carrier is provided with an intaglio motif and at least parts of the embossed structure are disposed in the area of the intaglio motif.

31. A method according to claim 29, characterized in that the first coating is produced by the offset process.

32. A method according to claim 29, characterized in that the embossed structure and the second coating are produced by ink-carrying intaglio printing.

33. A method according to claim 32, characterized in that the second coating is executed as a color split.

34. A method according to claim 29, characterized in that the first coating is applied first, and in a second step the embossed structure and the second coating are transferred simultaneously.

35. The data carrier of claim 28 wherein the paper of value is a bank note.

* * * * *